United States Patent
Yi et al.

(10) Patent No.: US 7,165,030 B2
(45) Date of Patent: Jan. 16, 2007

(54) CONCATENATIVE SPEECH SYNTHESIS USING A FINITE-STATE TRANSDUCER

(75) Inventors: Jon Rong-Wei Yi, Cambridge, MA (US); James Robert Glass, Cambridge, MA (US); Irvine Lee Hetherington, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 725 days.

(21) Appl. No.: 09/954,979

(22) Filed: Sep. 17, 2001

(65) Prior Publication Data

US 2003/0055641 A1     Mar. 20, 2003

(51) Int. Cl.
    G10L 15/08    (2006.01)
(52) U.S. Cl. .................. 704/238; 704/258; 704/260
(58) Field of Classification Search ............. 704/260, 704/256, 242, 239, 259, 258, 261, 262, 263, 704/266, 270, 271, 238
See application file for complete search history.

(56) References Cited

U.S. PATENT DOCUMENTS 6,029,132 A * 2/2000 Kuhn et al. ................. 704/260
6,243,679 B1 * 6/2001 Mohri et al. ............. 704/256.8

OTHER PUBLICATIONS

Hunt, A.J.; Black, A.W.; "Unit selection in a concatenative speech synthesis system using a large speech database" Acoustics, Speech, and Signal Processing, 1996. ICASSP-96. Conference Proceedings., 1996 IEEE International Conference on vol. 1, May 7-10.*

Beutnagel et al., "Rapid Unit Selection from a Large Speech Corpus Concatenative Speech Synthesis", in Eurospeech, Budapest, 1999.

Black et al., "Optimising Selection of Units from Speech Databases for Concatenative Synthesis", in ESCA Eurospeech'95, pp. 581-584, 1995.

Bulyko et al., "Unit Selection for Speech Synthesis Using Splicing Costs with Weighted Finite State Transducers", Proc. Eurospeech, 2001.

Bulyko et al., "Joint Prosody Prediction and Unit Selection for Concatenative Speech Synthesis", In Proc. of ICASSP, 2001.

Hunt et al., "Unit Selection in a Concatenative Speech Synthesis System Using a Large Speech Database", Proc. Of ICASSP, 1996.

(Continued)

Primary Examiner—Richemond Dorvil
Assistant Examiner—Huyen X. Vo
(74) Attorney, Agent, or Firm—Fish & Richardson P.C.

(57) ABSTRACT

A method for concatenative speech synthesis includes a processing stage that selects segments based on their symbolic labeling in an efficient graph-based search, which uses a finite-state transducer formalism. This graph-based search uses a representation of concatenation constraints and costs that does not necessarily grow with the size of the source corpus thereby limiting the increase in computation required for the search as the size of the source corpus increases. In one application of this method, multiple alternative segment sequences are generated and a best segment sequence is then be selected using characteristics that depend on specific signal characteristics of the segments.

14 Claims, 17 Drawing Sheets

OTHER PUBLICATIONS

Jannedy et al., "Name pronunciation in German text-to-speech synthesis", 1997.

Mobius, B., "Word and Syllable Models for German Text-to-Speech Synthesis"< Proceedings of the Third ESCA Workshop, 1998.

Mohri, M., "Finite-State Transducers in Language and Speech Processing", Computational Linguistics, 1997.

Mohri, M., "Weighted Grammar Tools: The GRM Library", Robustness in Language and Speech Technology, Kluwer Academic Publishers, 2000, pp. 19-40.

Riley et al., "Transducer Composition for Context-Dependent Network Expansion", IEEE Automatic Speech Recognition Workshop, Snowbird, Utah, Dec. 1995.

Yi et al., "Natural-Sounding Speech Synthesis Using Variable-Length Units", 5th International Conference on Spoken Language Processing, Sydney, Australia, Nov. 30-Dec. 4, 1998.

Yi et al., "A Flexible, Scalable Finite-State Transducer Architecture for Corpus-Based Concatentative Speech Synthesis", These Proceedings., Beijing, China, Oct. 2000.

* cited by examiner vowel: y iy ih ix ux ey eh ae ay oy uw uh ah ax ow er aa ao aw
semivowel: w l r el
nasal: m em n en ng
aspirant: hh
obstruent: b bcl p pcl f v d dcl t tcl s z sh zh ch jh th dh dx g gcl k kcl
silence: h# pau

FIG. 10A

|  | vowel | semivowel | nasal | obstruent | aspirant | silence |
|---|---|---|---|---|---|---|
| vowel | 10000 | 10000 | 7500 | 10 | 10 | 10 |
| semivowel | 1000 | 7500 | 7500 | 10 | 10 | 10 |
| nasal | 5000 | 10 | 10 | 10 | 10 | 10 |
| obstruent | 10 | 10 | 10 | 10000 | 10 | 10 |
| aspirant | 5000 | 5000 | 10 | 5000 | 10 | 10 |
| silence | 10 | 10 | 10 | 10 | 10 | 10 |

FIG. 10B vowel: y iy ih ix ux ey eh ae ay oy uw uh ah ax ow er aa ao aw w l r el
fricative: f v s z th dh dx sh zh ch jh hh
stop: b bcl d dcl g p pcl t tcl k kcl
nasal: m em n en ng
silence: h# pau

FIG. 11 labial: b bcl p pcl f v w
dental: d dcl t tcl s z sh zh ch jh th dh dx
velar: g gcl k kcl
nasal_labial: m em
nasal_dental: n en
nasal_velar: ng
front: y iy ih ix ux ey eh ae ay oy
back: uw uh ah ax ow er aa ao aw l r el
none: hh h# pau

| | labial | alveolar | velar | m | n | ng | front | back | none |
|---|---|---|---|---|---|---|---|---|---|
| labial | 10 | 1000 | 1000 | 1000 | 1000 | 1000 | 1000 | 1000 | 1000 |
| alveolar | 1000 | 10 | 1000 | 1000 | 1000 | 1000 | 1000 | 1000 | 1000 |
| velar | 1000 | 1000 | 10 | 1000 | 1000 | 1000 | 1000 | 1000 | 1000 |
| m | 100 | 1000 | 1000 | 10 | 1000 | 1000 | 1000 | 1000 | 1000 |
| n | 1000 | 100 | 1000 | 1000 | 10 | 1000 | 1000 | 1000 | 1000 |
| ng | 1000 | 1000 | 100 | 1000 | 1000 | 10 | 1000 | 1000 | 1000 |
| front | 1000 | 1000 | 1000 | 1000 | 1000 | 1000 | 10 | 1000 | 1000 |
| back | 1000 | 1000 | 1000 | 1000 | 1000 | 1000 | 1000 | 10 | 1000 |
| none | 1000 | 1000 | 1000 | 1000 | 1000 | 1000 | 1000 | 1000 | 10 |

FIG. 12C

| | labial | alveolar | velar | m | n | ng | front | back | none |
|---|---|---|---|---|---|---|---|---|---|
| labial | 10 | 1000 | 1000 | 1000 | 1000 | 1000 | 1000 | 1000 | 1000 |
| alveolar | 1000 | 10 | 1000 | 1000 | 1000 | 1000 | 1000 | 1000 | 1000 |
| velar | 1000 | 1000 | 10 | 1000 | 1000 | 1000 | 1000 | 1000 | 1000 |
| m | 100 | 1000 | 1000 | 10 | 1000 | 1000 | 1000 | 1000 | 1000 |
| n | 1000 | 100 | 1000 | 1000 | 10 | 1000 | 1000 | 1000 | 1000 |
| ng | 1000 | 1000 | 100 | 1000 | 1000 | 10 | 1000 | 1000 | 1000 |
| front | 1000 | 1000 | 1000 | 1000 | 1000 | 1000 | 10 | 1000 | 1000 |
| back | 1000 | 1000 | 1000 | 1000 | 1000 | 1000 | 1000 | 10 | 1000 |
| none | 1000 | 1000 | 1000 | 1000 | 1000 | 1000 | 1000 | 1000 | 10 | retroflex: r er
round: uw ux w ow aw
sonorant: y iy ih ix ey eh ae ay oy uh ah ax aa ao l el m em n en ng
other: b bcl p pcl f v d dcl t tcl s z sh zh ch jh th dh dx g gcl k kcl hh h# pau

FIG. 13A retroflex: r er
round: uw ux w b bcl p pcl f v m em
sonorant: y iy ih ix ey eh ae ay oy aw uh ah ax ow aa ao l el n en ng
other: d dcl t tcl s z sh zh ch jh th dh dx g gcl k kcl hh h# pau

FIG. 13B

| | | | | |
|---|---|---|---|---|
| retroflex | 10 | 100 | 100 | 100 |
| round | 100 | 10 | 100 | 100 |
| sonorant | 100 | 100 | 10 | 100 |
| other | 100 | 100 | 100 | 10 |

FIG. 13C

| | | | | |
|---|---|---|---|---|
| retroflex | 10 | 100 | 100 | 100 |
| round | 100 | 10 | 100 | 100 |
| sonorant | 100 | 100 | 10 | 100 |
| other | 100 | 100 | 100 | 10 |

FIG. 13D

FIG. 14A front: y iy ih ix ey eh ae ay oy
back: uh ah ax aa ao l el
retroflex: r er
round: uw ux w ow aw
other: b bcl p pcl f v d dcl t tcl s z sh zh ch jh th dh dx g gcl k kcl m em n en ng hh h# pau

FIG. 14B front: y iy ih ix ey eh ae aw
back: uh ah ow aa ao ay oy l el
retroflex: r er
round: uw ux w
schwa: ax
other: b bcl p pcl f v d dcl t tcl s z sh zh ch jh th dh dx g gcl k kcl m em n en ng hh h# pau

FIG. 14C

| | front | back | retroflex | round | other |
|---|---|---|---|---|---|
| front | 10 | 10 | 10 | 10 | 10 |
| back | 10 | 10 | 10 | 10 | 10 |
| retroflex | 10 | 10 | 10 | 10 | 10 |
| round | 10 | 10 | 10 | 10 | 10 |
| other | 500 | 500 | 500 | 500 | 10 |

FIG. 14D

| | front | back | retroflex | round | schwa | other |
|---|---|---|---|---|---|---|
| front | 10 | 100 | 100 | 100 | 500 | 100 |
| back | 100 | 10 | 100 | 100 | 500 | 100 |
| retroflex | 100 | 100 | 10 | 100 | 500 | 100 |
| round | 100 | 100 | 100 | 10 | 500 | 100 |
| schwa | 500 | 500 | 500 | 500 | 10 | 500 |
| other | 100 | 100 | 100 | 100 | 500 | 10 | obstruent: b bcl p pcl f v d dcl t tcl s z sh zh ch jh th dh dx g gcl k kcl hh h# pau
sonorant: y iy ih ix ux ey eh ae aw uw uh ah ax ow er aa ao ay oy w l r el m em n en ng

FIG. 15A voiced: b bcl v d dcl z zh jh dh g gcl dx h# pau
unvoiced: p pcl f t tcl s sh ch th k kcl hh
sonorant: y iy ih ix ux ey eh ae aw uw uh ah ax ow er aa ao ay oy w l r el m em n en ng

FIG. 15B

|  | obstruent | sonorant |
|---|---|---|
| obstruent | 10 | 1000 |
| sonorant | 1000 | 10 |

FIG. 15C

|  | voiced | unvoiced | sonorant |
|---|---|---|---|
| voiced | 10 | 100 | 1000 |
| unvoiced | 100 | 10 | 1000 |
| sonorant | 1000 | 1000 | 10 |

FIG. 15D

CONCATENATIVE SPEECH SYNTHESIS USING A FINITE-STATE TRANSDUCER

STATEMENT AS TO FEDERALLY SPONSORED RESEARCH

This invention was made with government support under contract N66001-99-1-8904 monitored through the Naval Command, Control and Ocean Surveillance Center, and under contract DAAN02-98-K-003 monitored through the U.S. Army Natick Research Development and Engineering Center. The government has certain rights in the invention.

BACKGROUND

This invention relates to automatic speech synthesis.

Corpus-based concatenative speech synthesis has received much attention recently, and arguably provides the highest quality synthesized speech available today. In such synthesis systems, a large source corpus of speech is segmented and labeled according to speech units that are used to construct new utterances by concatenating the segments in a new order than that in which they were found in the corpus. In this way words and words sequences not present in the source corpus are synthesized by the system.

Much of the work to date has concentrated on techniques for processing waveform segments in order to smoothly concatenate them without introducing unnatural artifacts. Another area of work has considered approaches to making the search for segments to concatenate computationally efficient. Note that as the size of the corpus grows, the quality of the synthesized speech may increase due to the availability of better-matching segments, but the computational cost of finding those better-matching segments can grow unacceptably. Some work on segment selection has addressed methods of limiting the computation required for the search based on pre-processing of the source corpus.

SUMMARY

In a general aspect, the invention features a method for concatenative speech synthesis that includes a processing stage that selects segments based on their symbolic labeling in an efficient graph-based search, which uses a finite-state transducer formalism. This graph-based search uses a representation of concatenation constraints and costs that does not necessarily grow with the size of the source corpus thereby limiting the increase in computation required for the search as the size of the source corpus increases.

In one aspect, in general, the invention features a method for selecting segments from a corpus of source utterances for synthesizing a target utterance. A graph is searched in which each path through the graph identifies a sequence of segments of the source utterances and a corresponding sequence of unit labels that characterizes a pronunciation of a concatenation of that sequence of segments. Each path is associated with a numerical score that characterizes the quality of the sequence of segment. Searching the graph includes matching a pronunciation of the target utterance to paths through the graph, and selecting segments for synthesizing the target utterance based on numerical scores of matching paths through the graph.

Preferred embodiments of the invention may include one or more of the following features.

Selecting segments for synthesizing the target utterance includes determining a path through the graph that matches the pronunciation of the target utterance and selecting the sequence of segments that is identified by the determined path.

Determining the path includes determining a best scoring path through the graph.

Determining the best scoring path includes using a dynamic programming algorithm.

The method can include concatenating the selected sequence of segments to form a waveform representation of the target utterance.

Selecting the segments for synthesizing the target utterance includes determining multiple paths through the graph that each matches the pronunciation of the target utterance.

Selecting the segments further includes forming multiple sequences of segments, each associated with a different one of the multiple paths through the graph.

Selecting the segments further includes selecting one of the sequences of segments based on characteristics of those sequences of segments that are not determined by the corresponding sequences of unit labels associated with those sequences.

The method can include forming a representation of alternative pronunciations of the target utterance. Searching the graph then includes matching any of the pronunciations of the target utterance to paths through the graph.

A representation of the pronunciation of the target utterance is formed in terms of alternating unit labels and transitions labels.

The graph includes a first part that encodes a sequence of segments and a corresponding sequence of unit labels for each of the source utterances, and a second part that encodes allowable transitions between segments of different source utterances and encodes a transition score for each of those transitions Matching the pronunciation of the target utterance to paths through the graph includes considering paths in which each transition between segments of different source utterances identified by that path corresponds to a different subpath of that path that passes through the second part of the graph.

Selecting the segments for synthesis includes evaluating a score for each of the considered paths that is based on the transition scores associated with the subpaths through the second part of the graph.

A size of the second part of the graph, such as its number of nodes, is substantially independent of the size of the source corpus, and the complexity of matching the pronunciation through the graph grows less than linearly with the size of the corpus.

The method further includes providing the corpus of source utterances in which each source utterance is segmented into a sequence of segments. Each consecutive pair of segments in a source utterance forms a segment boundary, and each speech segment is associated with a unit label and each segment boundary is associated with a transition label. The method then includes forming the graph, including forming a first part of the graph that encodes a sequence of segments and a corresponding sequence of unit labels for each of the source utterances, and forming a second part that encodes allowable transitions between segments of different source utterances and encodes a transition score for each of those transitions.

Forming the second part of the graph is performed independently of the particular utterances in the corpus of source utterances.

The corpus of source utterances is augmented with additional utterances. The first part of the graph is augmented to encode the additional utterances, and the augmented first part is linked to the second part without modifying the second part based on the additional utterances.

The graph is associated with a finite-state transducer that accepts input symbols that include unit labels and transition labels, and that produces identifiers of segments of the source utterances.

Searching the graph is equivalent to composing a finite-state transducer representation of a pronunciation of the target utterance with the finite-state transducer with which the graph is associated.

In another aspect, in general, the invention is software stored on a computer-readable medium for causing a computer to perform the method summarized above.

The invention includes one or more of the following advantages.

Sequences of segments from the source utterances can be selected based on the unit labels of those segments and transition costs that are based on the unit labels. In this way, specific characteristics of the segments, such as signal characteristics of those segments, do not have to be considered in selecting the segments.

Multiple alternative pronunciations can be input, and the selection approach can determine a best segment sequence that matches any of the alternative pronunciations. For example, the alternative pronunciations can be determined based on linguistic rules for transforming a baseform pronunciation of the target utterance.

The approach can generate multiple alternative segment sequences, for example, as an N-best list, a graph, or a lattice. The best segment sequence can then be selected using characteristics that depend on specific signal characteristics of the segments, such as their pitch or spectral shape. In this way, the segment selection problem is decomposed into a first phase in which a good set of choices of segment sequences is determined based on symbolic representations of the segments, and then generally more computationally expensive approaches can be applied to determine which segment sequence will yield the highest quality waveform.

A variety of different types of units can be used, including phones, sub-phone units, syllables, or words. The units can symbolically encode other characteristics, such as prosodic information, or categorical signal characteristics.

By implementing all or part of the approach using finite-state transducer representations, efficient general algorithms can be applied to those parts without having to develop or optimize specific algorithms.

Other features and advantages of the invention are apparent from the following description, and from the claims.

DESCRIPTION OF DRAWINGS

FIG. 10A is a table of concatenation classes;

FIG. 10B is a table of concatenation costs;

FIG. 11 is a table of classes used for determining substitution costs;

FIG. 12A is a table of context classes for vowel substitutions,

FIGS. 12B–C are tables of vowel substitution costs;

FIGS. 13A–B are table of context classes for fricative substitutions;

FIGS. 13C–D are tables of fricative substitution costs;

FIGS. 14A–B are table of context classes for stop substitutions;

FIGS. 14C–D are tables of stop substitution costs;

FIGS. 15A–B are table of context classes for nasal substitutions;

FIGS. 15C–D are tables of nasal substitution costs; and

DESCRIPTION

Figure 1:
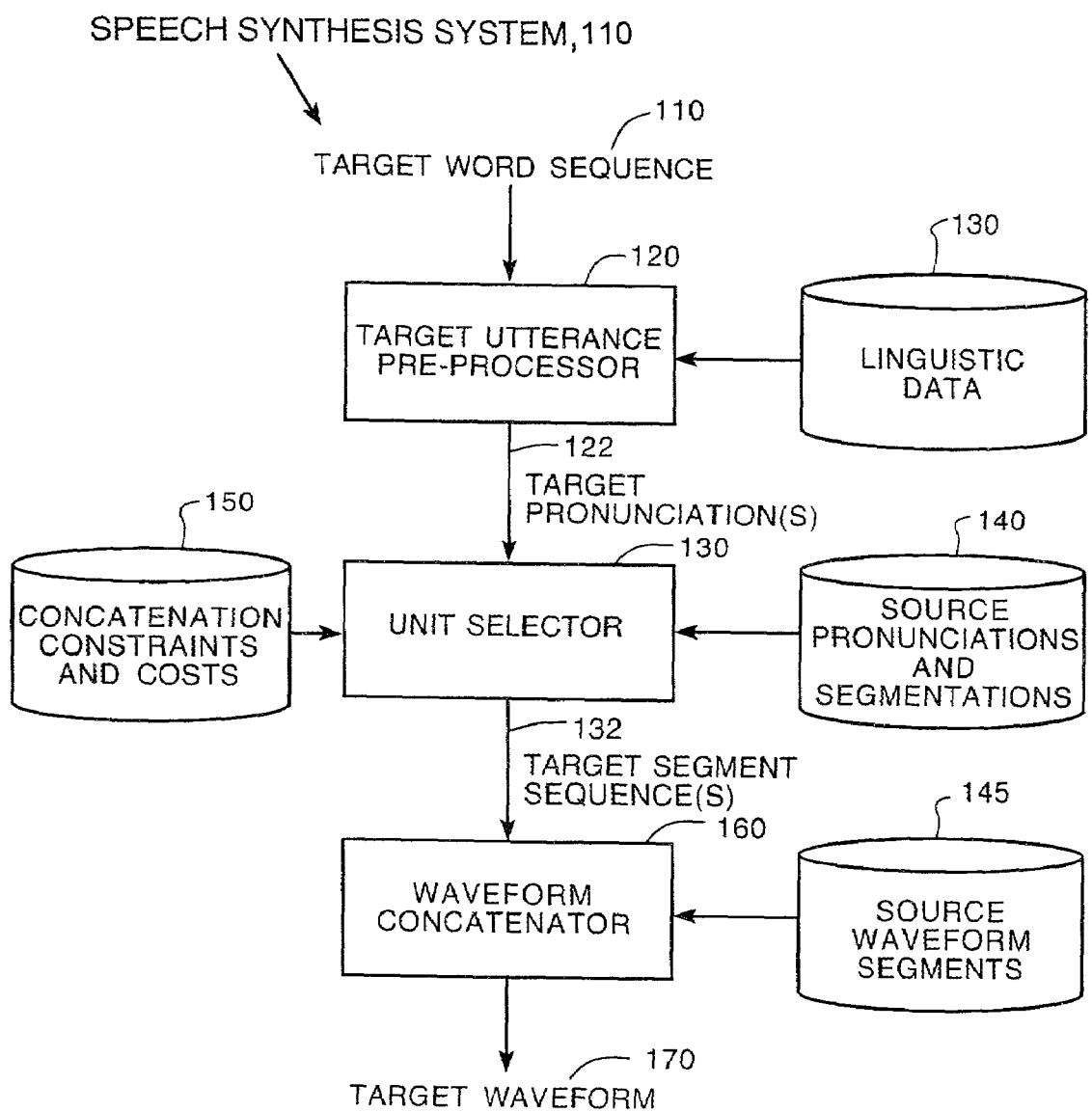
FIG. 1 is a block diagram of a synthesis system.

1 System Overview (FIG. 1)

Referring to FIG. 1, a speech synthesis system 100 uses a corpus-based waveform concatenation approach. Synthesis system 100 processes a desired target word sequence 100 to produce a target waveform 170, which is made up of a concatenation of a sequence of waveform segments from a corpus of source utterances. Speech synthesis system 100 makes use of source pronunciations and segmentations 140, which represent the pronunciations and related time-segmentations of each of a corpus of source utterances, as well as source waveform segments 145, which are the segmented waveforms of the source utterances.

Speech synthesis system 100 includes a number of processing modules that perform processing stages of the transformation of target word sequence 110 into target waveform 170, which approximates a person speaking the target word sequence. There are three basic processing modules. First, a target utterance preprocessor 120 accepts target word sequence 110 and uses linguistic data 125 to determine one or more target pronunciations 122 that are consistent with the word sequence. These pronunciations are represented in terms of a set of linguistically based units.

In this embodiment, the standard TIMIT phonetic alphabet is used as the set of units represent word pronunciations and with which the segments of the source corpus are associated. It should be noted, however, that the approach described below is also applicable to alternative sets of labels. The alternative units may be sub-phonetic, for example, half-phones that use a separate label for the first half and the second half of each phone. The labels can also correspond to super-phonetic units, for example, parts of or complete words such as digits. Also, combinations of different types of units can be included in a single system.

In the second processing stage, a unit selector 130 accepts target pronunciations 122 and uses source pronunciations and segmentations 140 to determine one or more target segment sequences 132 that are consistent with the target word sequence. Each of the target segment sequences 132 identifies a particular sequence of waveform segments of source waveform segments 145. Each segment in the sequence matches a corresponding one of the sequences of phones in one of the pronunciations produced by utterance preprocessor 120. Unit selector 130 also makes use of concatenation constraints and costs 150, which include data that characterizes the cost of concatenating different sequences of segments of the source utterances based on the labeling of the segments that form the pronunciations of the source utterances. That is, concatenation constraints and costs 150 provide data that is used by unit selector 130 to choose segment sequences based on symbolic labeling of the segments. Concatenation constraints and costs 150 do not necessarily depend on the number or characteristics of the source corpus, and in particular, do not have to be recomputed if additional source utterances are added resulting in source pronunciations and segmentations 140 being updated.

In the third and final stage, waveform concatenator 160 accepts target segment sequences 132 and uses source waveform segments 145 to construct target waveform 170. If target segment sequences 132 specify more than a single possible sequence of segments, waveform concatenator 160 selects one of the sequences, for example, a "best" sequence based on characteristics of the source waveform segments. Such selection can take into account the nature of the time domain transitions between waveform segments, for example, related to pitch and spectral discontinuities.

2 FST Representation

Speech synthesis system 100 makes use of graph-based representations of target word sequence 110, linguistic data 125, concatenation constraints and costs 150, and source pronunciations and segmentations 140, and implements the processing steps of target utterance preprocessor 120 and unit selector 130 using graph-based algorithms. In particular, the synthesis procedure is modeled and implemented as a series of compositions of finite-state transducers (FSTs).

Each finite-state transducer is represented as a graph with directed arcs. Each directed arc has an input symbol, an output symbol, and an optional cost. The input symbol belongs to an input alphabet for that transducer or is a null symbol, represented in the drawings by an epsilon ($\epsilon$). The output symbol of each arc belongs to the output alphabet for that transducer, or is null. The cost is a scalar quantity such that the costs on arcs of a path can be combined to determine an overall cost for the path. In this embodiment, the costs are additively combined and an omitted cost is equivalent to a cost of zero. Each FST has a start node and one or more end nodes. A finite-state transducer accepts a label sequence from the input alphabet if there is a path from the start node to an end node through the graph such that the path includes only the labels of the label sequence in order, with optional nulls between the labels, as the input symbols on the arcs of the path. The output sequence corresponding to a path is made up of the sequence of non-null output symbols on the arcs of the path. Note that there may be multiple paths that accept a particular input sequence; therefore the corresponding output in general specifies a number of output sequences rather than a single sequence. These multiple sequences are typically represented as graph. Furthermore, a graph of input labels can be processed using an FST to produce a graph of output labels.

An input to an FST can also be represented as an FST itself. In this case, the output symbols of the input FST correspond to the "inputs" to the processing step described above. Therefore, the output alphabet of the input FST is the same as the input alphabet of the FST that will process the output. The operation of processing an input FST with the second FST is termed "composition," which is a non-commutative associative operation that takes two FSTs and produces a third, represented as A∘B=C. The input alphabet of the resulting FST (C) is the then same as (or is included in) the input alphabet of the first FST (A) and the output alphabet of the resulting FST (C) is the same as (or is included in) the output alphabet of the second FST (B).

The processing steps performed in target utterance preprocessor 120 and unit selector 130 are implemented as a composition of five FSTs: a word sequence (W); a lexicon (L), which represents baseform pronunciations of a set of words; phonological rules (P); a transition transformation (T), which is used primarily for search efficiency; and a synthesis component (S), which maps all possible phone sequences to identifiers of waveform segments from the corpus of source utterances. That is, unit selection makes use of a composition that is equivalent to W∘L∘P∘T∘S to select the particular sequence of segments of the source utterances to be concatenated to form the synthesized utterance. As is described fully below, none of the first four of these FST (W, L, P, or T) depend on the number of source utterances or are necessarily tailored to the application domain of the source utterances. The last FST, synthesis FST S, is formed using a "constraint kernel" that encodes concatenation and constraint costs 150 which is linked to a number of separate FSTs that each corresponds to a different source utterance. The structure of synthesis FST S is such that computation required to implement the composition with it does not grow substantially with the number of segments in the source utterances. Composition with S is implemented using a dynamic-programming algorithm whose computational complexity grows less than linearly with the number of segments in the corpus, in contrast to a complexity that can be in the order of the square of the number of segments in a brute-force search. Furthermore, as is also described below, the approach does not necessarily disallow ("prune") particular sequences of segments. In this embodiment, the dynamic programming algorithm allows all sequences of source segments to be considered, with some sequences being associated with higher costs than others.

Figure 2:
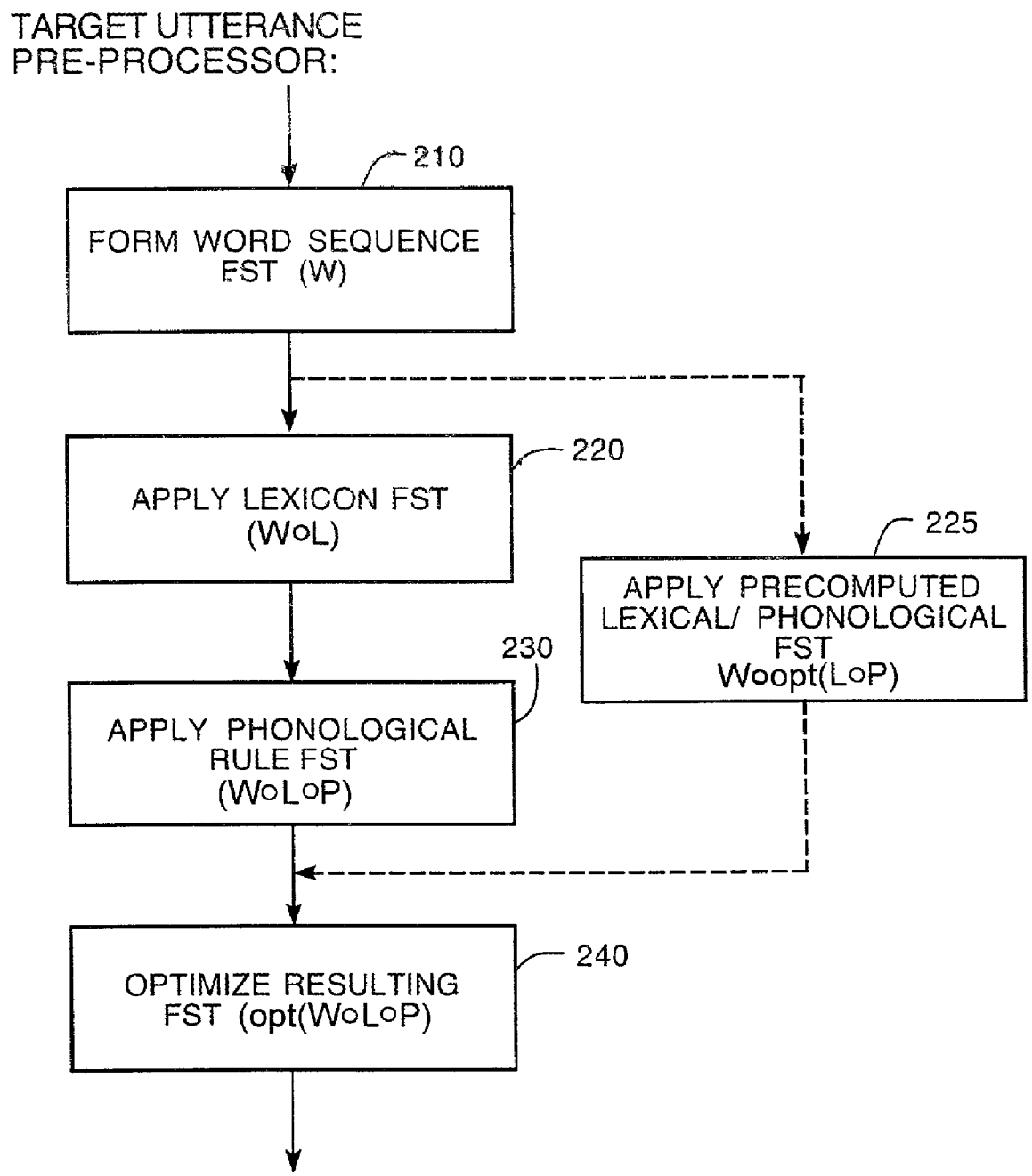
FIG. 2 is a flowchart of an utterance preprocessing procedure.

3 Target Utterance Preprocessor 120 (FIG. 2)

Referring to the flowchart of FIG. 2, target utterance preprocessor 120 (FIG. 1) performs a series of transformations of target word sequence 110 to produce target pronunciations 122, which are represented as an FST. The process of expanding target word sequence 110 to form target pronunciations 122 is analogous to a procedure used in speech recognition to form a graph or FST representation of a grammar that can be accepted by the speech recognizer. In speech recognition, the grammar is created before an input waveform is received, and the input waveform is used to choose the best path through the graph that corresponds to the input waveform, thereby determining what words were spoken. Here, synthesis system 100 generates a pronunciation graph for the desired target utterance and that graph is then used by the subsequence processing stages to generate a waveform representation of the target utterance.

The first step of target utterance pre-processing is to form an FST representation of target word sequence 110 (step 210). Given the target word sequence, a word sequence FST (W) is formed as linear chain with one target word as the output label on each arc. That is, if the target word sequence is <PAUSE> BOSTON <PAUSE>, where <PAUSE> is a "word" that represents a silent gap between words or at the beginning or end of a sentence, then W is a four node FST with three arcs, one arc for each of the words. In this embodiment, the input labels are made equal to the output labels, although the input labels do not directly affect further processing. For example, the input labels can alternatively be related to the semantic meaning of the utterance.

Note that rather than processing a single target word sequence, a network of alternative word sequences can be processed in the same way, with the word sequence FST representing the alternative word sequences. For example, alternatives DO NOT versus DON'T or TWO HUNDRED AND TWENTY versus TWO TWENTY could be used input, with later processing stages choosing between the alternative word sequences based on characteristics (costs) of synthesizing the alternatives and choosing the "best" alternative.

The next step of target utterance preprocessing is to apply the lexicon FST (L), which is implemented as a composition of W with L (step 220). Lexicon FST L has an input alphabet that includes all possible words that can be synthesized by the system, and an output alphabet of phonemic symbols that are used to represent baseform (canonical) pronunciations of possible words. When W is composed with L, the resulting FST encodes the one or more possible baseform pronunciations for the word sequence or sequences encoded in the word FST.

The next step of target utterance preprocessing is to apply phonological rules FST (P), which is implemented as a composition of the result of the previous step (W∘L) with P (step 230). Phonological rules FST P has an input alphabet of phonemic symbols and an output alphabet of phonetic symbols. Note that the segments of the source utterances are labeled according to this same alphabet of phonetic symbols. Phonological rules FST (P) typically expands the baseform pronunciations produced by lexicon FST (L) into networks of alternate phonetic pronunciations that are consistent with the baseform. Note also that phonological rules FST (P) also can introduce cross-word coarticulation-related transformations.

Preferably, rather than composing W with L and then composing the result with P, L and P are composed prior to processing a target utterance and their composition is optimized to reduce the computation needed at run-time when the target utterance is known. Then, instead of composing W with L and then with P (steps 220 and 230), W is composed with the optimized precomputed composition of L with P (step 225), which is represented as (W∘opt(L∘P)), where opt( ) represents optimization and optional determinization of an FST. Finally, the resulting FST (W∘L∘P) is optimized (step 240) in order to reduce the computation required for further processing of the target utterance.

Lexicon FST L and phonological rules FST P can introduce preferences for different pronunciations by adding costs to various arcs of the FSTs. For example, an allowable but unlikely or unusual pronunciation may be represented in target pronunciations 122, but the arcs associated with that pronunciation may have costs which penalize the choice of that pronunciation at subsequent processing stages of the synthesis algorithm.

Figure 3:
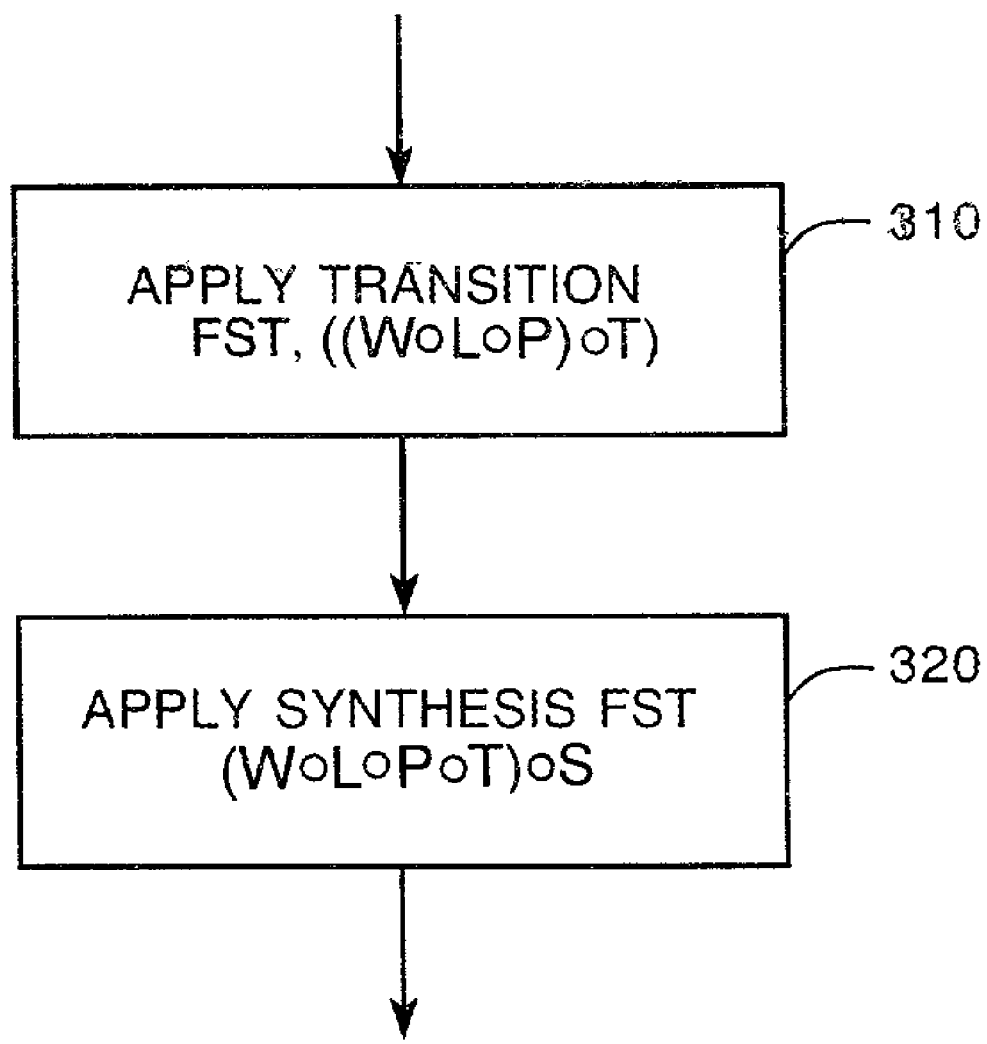
FIG. 3 is a flowchart of a unit selection procedure.

4 Unit Selector 130 (FIG. 3)

Unit selector 130 transforms the target pronunciations 122 to form target segment sequences 132. Referring to FIG. 3, a first step is to apply a transition FST T to the target pronunciation FST (step 310). Transition FST T serves the purpose of introducing arcs that are associated with transitions between phones. For instance, if the input to T is an FST that produces the sequence ( . . . , a, b, c, . . . ), then the output after composition with T is an FST that produces the sequence ( . . . , a, a|b, b, b|c, c, . . . ). That is, the input alphabet of T is the set of phonetic symbols while the output alphabet is the union of the set of phonetic symbols and the set of pairs of phonetic symbols for the transitions. The result of this composition is optionally optimized once again, yielding opt((W∘opt(L∘P))∘T), where the parentheses indicate the order in which the operations are performed. This FST produces alternating sequences of phone and phone-transition symbols (ignoring the possible null outputs).

Note that alternatively, T can be composed with L and P prior to processing the target utterance by precomputing opt(L∘P∘T) and composing W directly with that precomputed FST at step 225, yielding opt(W∘opt(L∘P∘T)), and omitting step 310.

The final step of unit selection corresponds to composition with synthesis FST S (step 320) followed by selection of the lowest cost path, or a set of the N best paths, through the resulting FST. The particular choice of structure of S has a great impact on the computational cost to actually perform the composition. In this embodiment, synthesis FST S is designed to provide relatively efficient processing of this composition step, and to allow much of S to be precomputed independently of the source corpus.

Synthesis FST S maps sequences of phones and phone transitions into sequences of identifiers of waveform segments. Desirable properties of S are that it have low perplexity (average branching factor) and that it be scalable with large numbers of source utterances. As introduced above, S is constructed from a constraint kernel that is independent of the source utterances, and portion that encodes pronunciations and segmentations of the source utterances themselves. The constraint kernel encodes the concatenation constraints and costs independently of the source utterances or the domain (application area) of those utterances.

In a first implementation of step 320, unit selector 130 finds a single best segment sequence using a dynamic programming algorithm that is analogous to the Viterbi algorithm that is used in speech recognition. The algorithm accepts a graph of possible pronunciations, rather than a single pronunciation. Therefore, the nodes of the input graph are first topologically sorted and the dynamic programming algorithm is applied according to the ordering of the nodes. The cost of each partial path is accumulated during the application of the dynamic programming algorithm. A settable ("tunable") parameter controls which partial paths through S, if any, are pruned because their cost is too high, either in an absolute level or relative to a best partial path. Pruning during the dynamic programming can also be set to limit the number of active alternative paths to reduce computation. Other implementations make use of modified dynamic programming approaches to determine a set of the lowest cost paths through S (an "N-best list") that are consistent with the input, or to determine a graph that represents the alternative paths through S that are consistent with the input.

To reduce latency in synthesizing long utterances, a long utterance is optionally broken up into chunks by target utterance preprocessor 120, for example at pauses, and each chunk is processed separately and the concatenated by waveform concatenator 160 to form the entire utterance.

5 Synthesis FST S (FIGS. 4–9)

Figure 4:
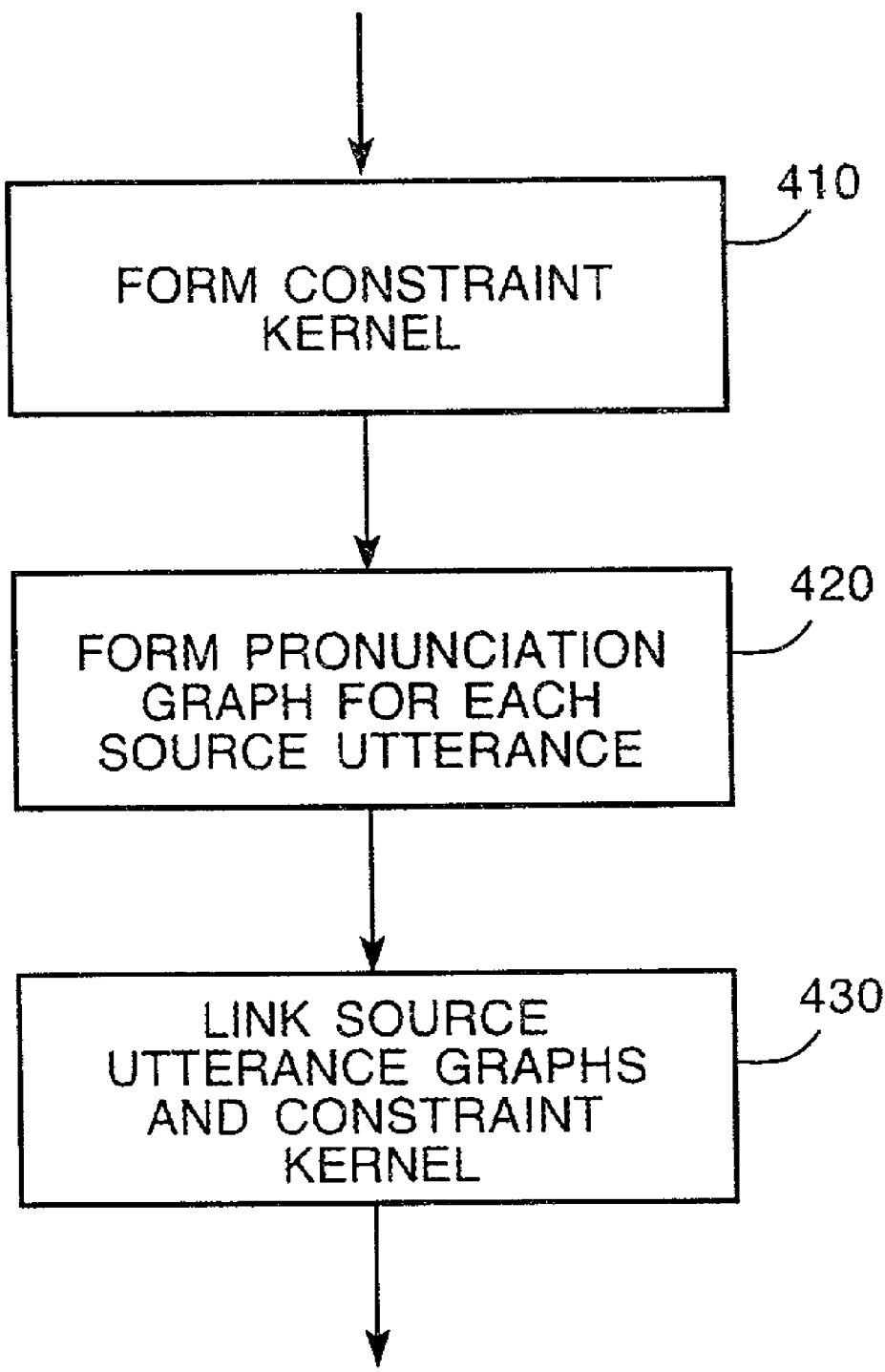
FIG. 4 is a flowchart of a procedure for forming a synthesis finite-state transducer (FST)

Synthesis FST S is formed by combining separately constructed components. Referring to FIG. 4, a constraint kernel 520 (see FIG. 5), which forms part of synthesis FST S, is first constructed (step 410). This involves processing concatenation constraints and costs 150 (FIG. 1) to form the constraint kernel, whose structure is described in detail below. Note that the constraint kernel does not have to depend on the stored source utterances. It can be computed independently of the source utterances and does not have to be modified depending on the number or characteristics of the source utterances.

Next, each of source pronunciation and segmentations 140 is processed and expanded into an individual FST (step 420). Each of these FSTs forms a linear chain of states, and includes arcs that are labeled with alternating phones and phone transitions.

Figure 5:
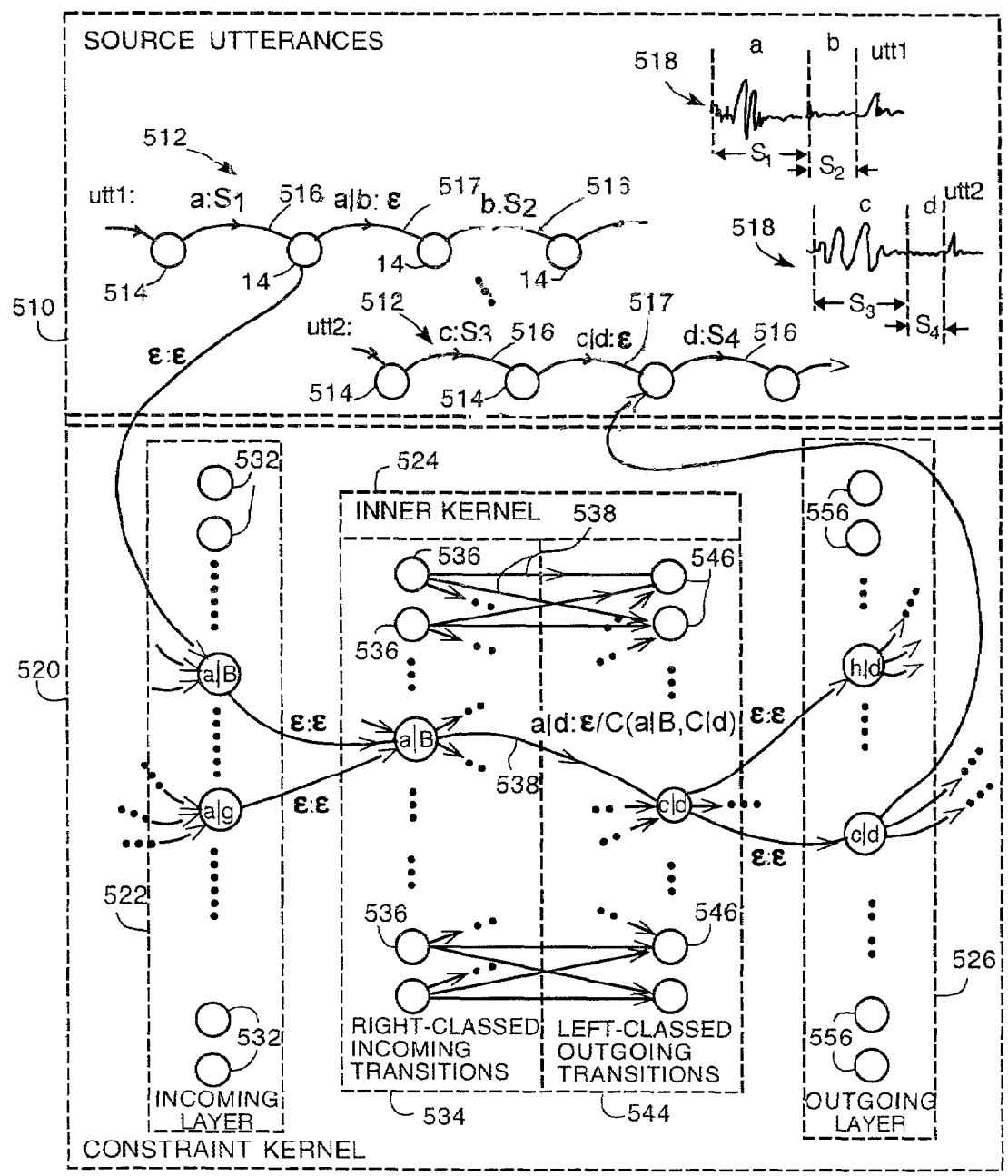
FIG. 5 is a diagram that illustrates a synthesis FST.

Referring to FIG. 5, synthesis FST S 500 includes a source utterances portion 510 and constraint kernel 520. In the source utterances portion, each source utterance is represented as a linear chain. Alternating arcs in the chain are associated with phonetic segments and phone transitions. In FIG. 5, two of the many source utterances 512, utt1 and utt2, are partially represented. Each source utterance includes a sequence of nodes 514 with alternating phone arcs 516 and phone transition arcs 517. The input symbol of each phone arc is a phonetic symbol associated with a source segment, and the output symbol of that arc is an identifier of the specific waveform segment associated with that segment. The identifier is sufficient to later retrieve the particular portion of source utterance associated with that segment. There is a one-to-one relationship between the segments of the source utterances and phone arcs 516 of the source utterance portion 510. Phone transition arcs 517 have an input symbol in the set of pairs of phonetic symbols and a null output symbol. There is no cost to transitions in source utterances portion 510.

Constraint kernel 520 provides a path from any node 514 that is at the source of a phone transition arc 517 to any other node 514 that is at the destination of a phone transition arc 517. The details of the structure of constraint kernel 520 are discussed below. Composition with S essentially amounts to finding sequences of segments from various source utterances that together form a desired target phone sequence. To the extent possible, the goal is to avoid concatenating segments that are not contiguous in a source utterance. However, if a transition from a non-contiguous segment is necessary, a lower cost transition is preferable to a higher cost one.

Referring still to FIG. 5, if a target utterance requires synthesis of the phone sequence ( ..., a, d, ... ) and target utterance utt1 includes the phone sequence ( ..., a, b, ... ) and target utterance utt2 includes the phone sequence ( ..., c, d, ... ), then one possibility approach to synthesizing the target utterance is to use the a from utt1 and the d from utt2. In terms of the FST representation of the target utterance prior to composition with S, the input sequence is ( ..., a, a|d, d, ... ). A path through S uses the a from utt1, the a|d on an arc in constraint kernel 520, and the d from utt2 to match the sequence for the target utterance.

Constraint kernel 520 includes only arcs that have null output symbols, and input symbols that are either null or are a phone transition. Any path through the constraint kernel from a node 514 that is the destination of an arc 516 labeled with an a to a node 514 that is at the source of an arc 516 labeled with a d has exactly one non-null arc, and that arc has an a|d input label. The combination of costs of arcs along that path is equal to the cost of concatenating the particular non-contiguous segments together.

The cost of concatenating non-continuous segments is in general formed as a sum of three terms, In the example above in which a and d are concatenated, three components of cost are: (1) concatenation cost c(a,a)—the effect of concatenating an a segment and a d segment, (2) left substitution cost $s_{L,d}(a,c)$—the incremental cost of using a d that followed a c in its source utterance rather than following an a, and (3) right substitution cost $s_{R,a}(d,b)$—the incremental cost of using an a that is followed by a b rather than being followed by a d.

In this embodiment, the left substitution cost is approximated as the cost of using a d that followed a phone of class C to which phone c belongs rather than following an a, and the right substitution cost is approximated as the cost of using an a that is followed by a phone of class B to which phone b belongs rather than being followed by phone d. That is, $s_{L,d}(a,c)=s_{L,d}(a,C)$ and $s_{R,a}(d,b)=s_{R,a}(d,B)$. Note that the definitions of classes of phones are not the same in all contexts. In this embodiment, the classes for the left substitution costs depend on the label on the following phone (e.g., d) and the classes for the right substitution costs depend on the label of the prior phone (e.g., a). The cost of this transition is denoted $C(a|B,C|d)=s_{L,d}(a,C)+c(a,d)+s_{R,a}(d,B)$. In this embodiment, the classes are predefined based on linguistic characteristics, for example, based on the manner or production of the phones. Alternatively, other classifications can equivalently be used.

Turning now to the structure of constraint kernel 520, the transition costs outlined above are associated with particular paths through the constraint kernel. Constraint kernel 520 includes a incoming layer 522, which includes a number of incoming nodes 532, and an outgoing layer 526, which includes a number of outgoing nodes 556. There is one incoming node 532 for each possible phone transition that may occur in the source utterances. In general, if there are N possible phone labels, there are $N^2$ incoming nodes 532. Similarly, there is one outgoing node 556 for each possible phone transition.

Each incoming node 532 is linked to the source utterances such at each node 514 with an outgoing arc labeled with an a|b transition 517 is linked with a null arc to the incoming node 532 that is associated with an a|b transition. That is, each incoming node 532 will have, in general, a large number of incoming arcs, and the number of these incoming arcs grows with the size of the corpus of source utterances.

Each outgoing node 556 is similarly linked to a set of source nodes 514 such that an outgoing node that is associated with a c|d transition is linked by a null arc to each source node 514 that is at the destination of an arc 517 labeled with a c|d transition.

Within constraint kernel 520, each incoming node 532 is linked by some path (or multiple paths in some cases) to every outgoing node 556, and any path joining an incoming node 532 that is associated with an a|b transition and an outgoing node 556 that is associated with a c|d transition has exactly one arc labeled with an a|d transition and all other arcs are labeled with nulls. Furthermore, the combination (e.g., sum) of costs on the arcs on such a path represents the cost of concatenating an a that was originally followed by a b with a d that was originally preceded by a c.

Between input layer 522 and output layer 526, constraint kernel 520 includes an inner kernel 524. Inner kernel 524 has a right-classed incoming transition layer 534 and a left-classed outgoing transition layer 544. Within right-classed incoming layer 534, there are a number of right-classed incoming nodes 536. Each such node is associated with a particular phone and one of its classes of following phones. If, on average, each phone has M classes of following phones, there are NM right-classed incoming nodes 536 according to the definitions of the phone classes. In general, a number of incoming nodes 532 are linked to each right-classed incoming node 536. For example, if phone b and phone g are both in the same class of phones following a, say class B, then incoming node a|b and incoming node a|g are both linked to right-classed incoming node a|B by null transitions. Each left-classed outgoing node 546 is similarly linked to a number of outgoing nodes 556 based on the phone classifications defined for the following phone. Also, if each phone has M classes of preceding phones, then there are NM left-classed outgoing nodes 546. Note that the right classes and left classes may be different for a particular phone, and that in fact there may be a different number of right-classed incoming nodes 536 and left-classed outgoing nodes 546.

Within inner kernel 524, right-classed incoming nodes 536 are fully connected to left-classed outgoing nodes 546. That is, if there are NM right-classed incoming nodes 536 and NM left-classed outgoing nodes 546, there are $(NM)^2$ arcs 538 in inner kernel 524 Each arc 538 has a phone transition input symbol, a null output symbol, and a cost. For example, right-classed node a|B 536 is linked to left-classed node C|d 546 by an arc 538 with input symbol a|d and a cost C(a|B,C|d) that is described above.

Figure 6:
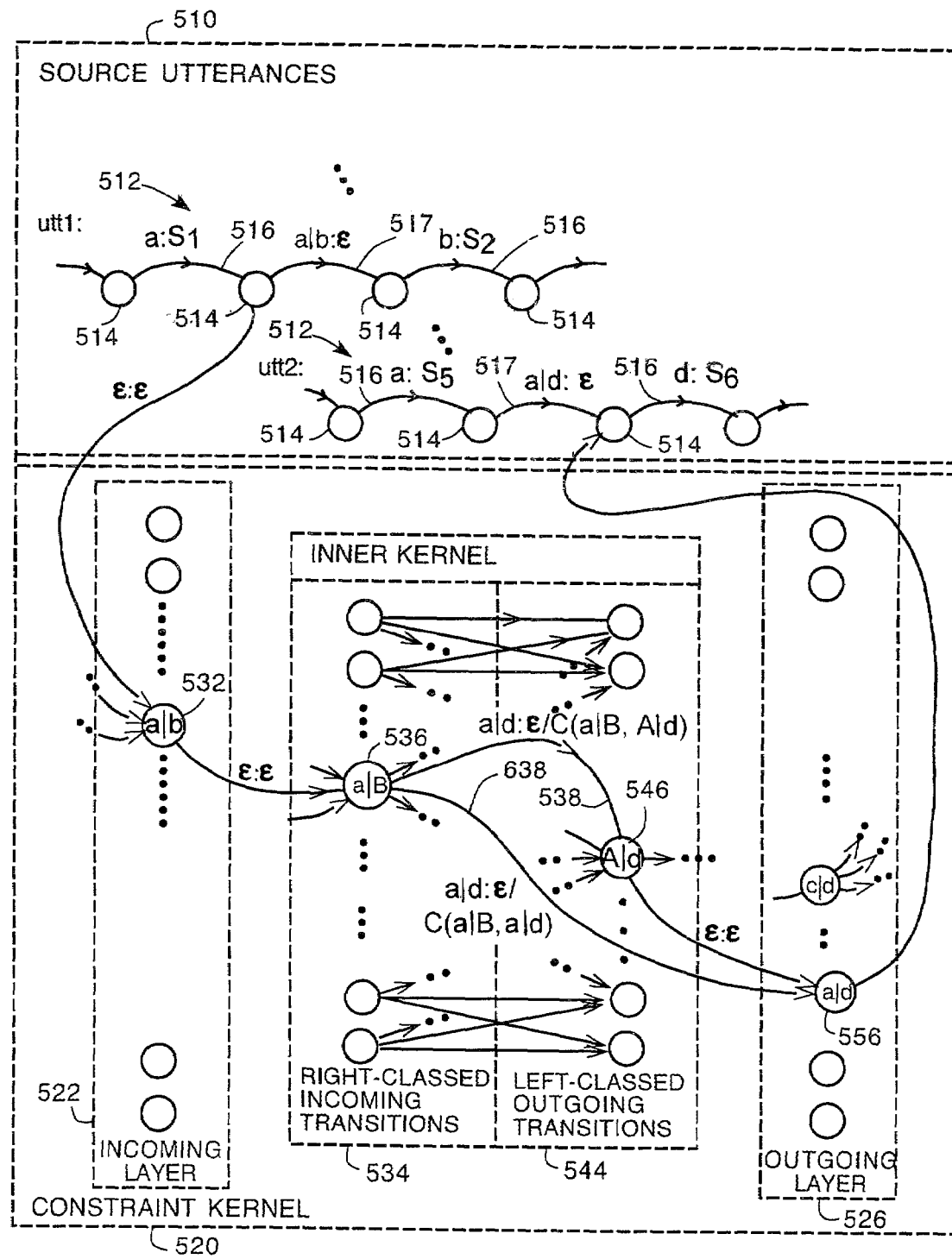
FIGS. 6–8 are diagrams that illustrate additional paths through the synthesis FST.

Referring to FIG. 6, constraint kernel 520 includes additional paths joining incoming layer 522 and outgoing layer 526. In FIG. 6, two utterances, utt1 and utt3 are shown. The first utterance, utt1, includes the sequence of phones ( . . . , a, b, . . . ) while the second utterance, utt3, includes ( . . . , a, d, . . . ). The target utterance requires the sequence ( . . . , a, d, . . . ). Constraint kernel 520 provides a path such that the a can come from utt1 while the d comes from utt3. Note that the cost of such a concatenation is lower than if the d in utt3 were preceded by a symbol other than a. In particular, the left substitution cost is assumed to be zero and $C(a|b,a|d)=C(a|B,a|d)=c(a,d)+s_{R,a}(d,B)$. This cost is implemented as by introducing an arc 638 from a right-classed node 536 associated with a|B directly to outgoing node 556 associated with phone transition a|d. This arc has an input symbol a|d and a cost C(a|B,a|d). Note that there is an additional path joining right-classed node 536 associated with a|B and outgoing node 556 associated with phone transition a|d, which is of the type introduced in FIG. 5. In particular an arc 538 joins right-classed node 536 associated with a|B with left-classed node 546 associated with A|d, where A is the class of phone a when followed by phone d, and this node is linked by a null arc to outgoing node a|d 556. This additional path will have higher cost than the direct path, and therefore should not be chosen by the dynamic programming algorithm.

Figure 7:
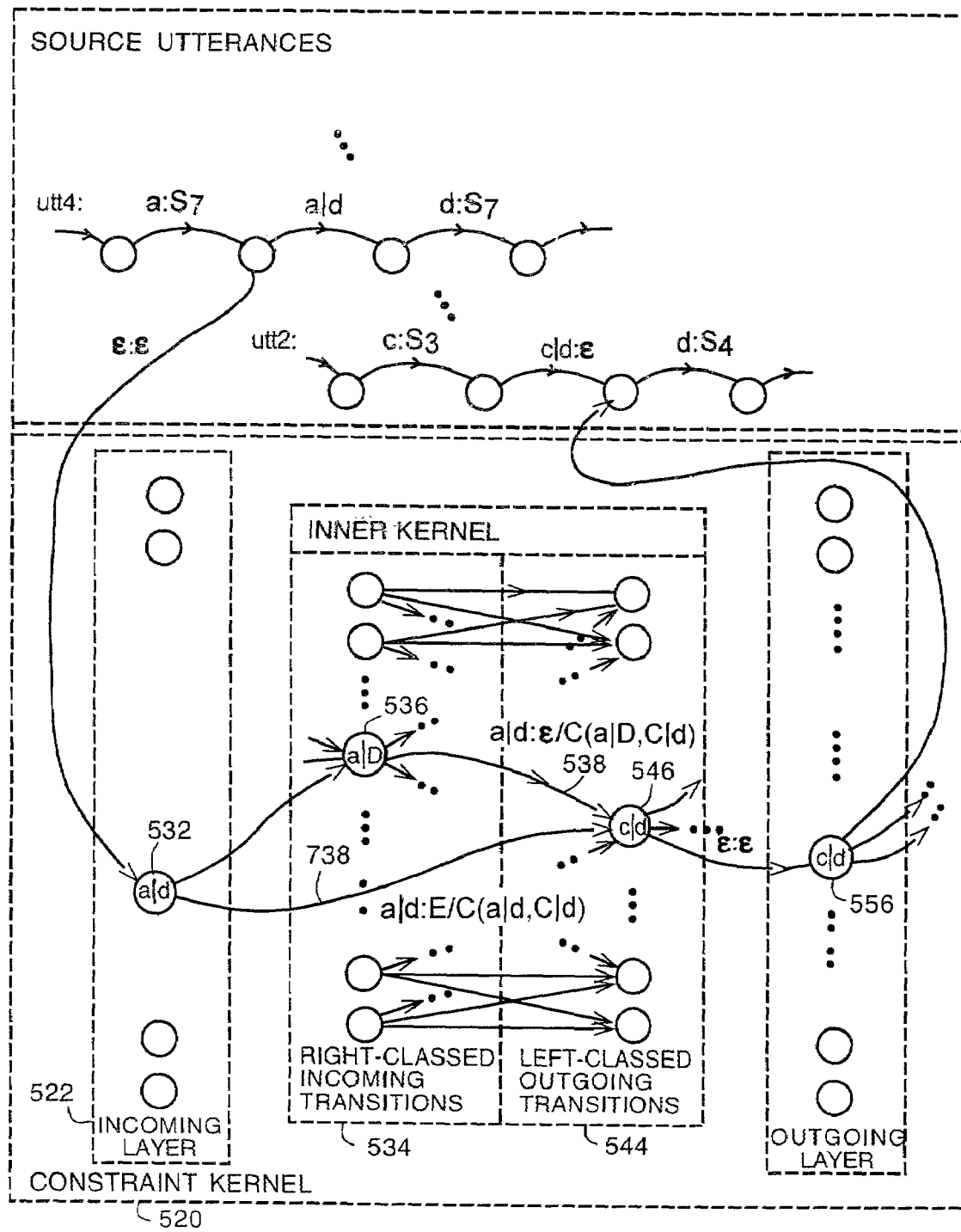

Referring to FIG. 7, constraint kernel 520 includes still additional paths joining incoming layer 522 and outgoing layer 526. In FIG. 7, two utterances, utt4 and utt2 are shown. The first utterance, utt4, includes the sequence of phones ( . . . , a, d, . . . ) while the second utterance, utt2, includes ( . . . , c, d, . . . ). The target utterance requires the sequence ( . . . , a, d, . . . ). Constraint kernel 520 provides a path such that the a can come from utt4 while the d comes from utt2. Note that the cost of such a concatenation is lower than if the a in utt4 were followed by a symbol other than d. In particular, the right substitution cost is assumed to be zero and $C(a|d,c|d)=C(a|d,C|d)=s_{L,d}(a,C)+c(a,d)$. This cost is implemented as by introducing an arc 738 from an incoming node 532 associated with a|d directly to left-classed outgoing node 546 associated with C|d. This arc has an input symbol a|d and a cost C(a|d,C|d). Note that there is an additional higher-cost path joining incoming node 532 associated with a|d and left-classed outgoing node 546 associated with C|d, which is of the type introduced in FIG. 5. In particular a null arc joins incoming node 532 associated with a|d to right-classed node a|D 536, and an arc 538 joins right-classed node a|D 536 and left-classed node C|d 546.

Figure 8:
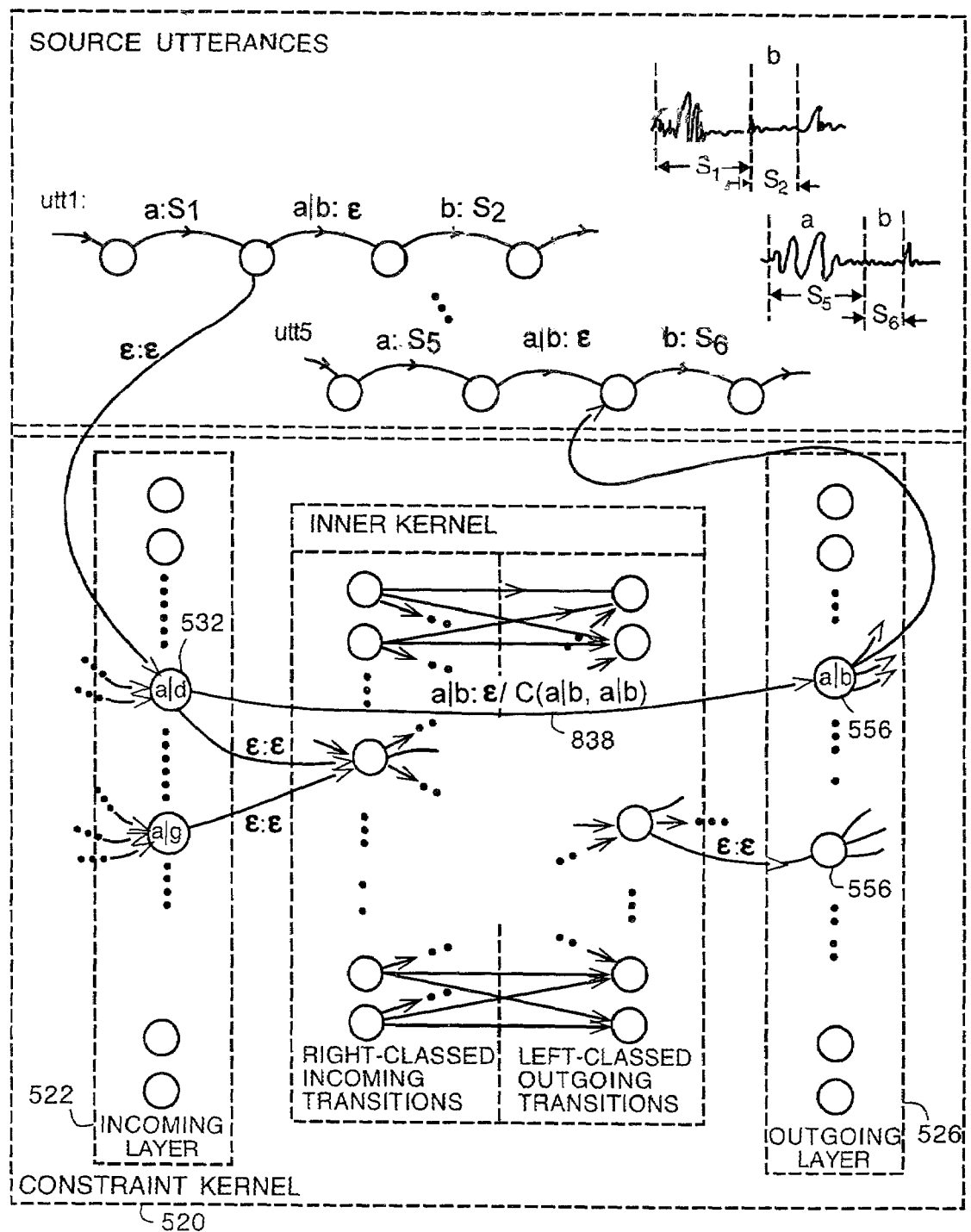

Referring to FIG. 8, constraint kernel 520 includes still additional paths joining incoming layer 522 and outgoing layer 526. In FIG. 8, two utterances, utt1 and utt5 are shown. Both utterances include the sequence of phones ( . . . , a, b, . . . ). The target utterance requires the sequence ( . . . , a, b, . . . ). Constraint kernel 520 provides a path such that the a can come from utt1 while the b comes from utt5. Note that the cost of such a concatenation is lower than if the a in utt1 were followed by a symbol other than b or if the b in utt5 were preceded by a symbol other than a. In particular, both the right and the left substitution costs are assumed to be zero and C(a|b,a|d)=c(a,d). This cost is implemented as by introducing an arc 838 from a incoming node 532 associated with a|b directly to the outgoing node 556 also associated with a|b. This arc has an input symbol a|b and a cost C(a|b,a|b). Note that there are additional higher-cost paths through constraint kernel 520 joining incoming node 532 associated with a|b and outgoing node 556 also associated with a|b, as illustrated in FIGS. 5–7.

The total number of labeled arcs in constraint kernel 520 is therefore $(MN)^2+2MN^2+N^2$. There are $(MN)^2$ arcs between the right-classed and left-classed nodes, $MN^2$ between the incoming nodes and the left-classed nodes as well as between the right-classed nodes and the outgoing nodes, and finally $N^2$ between the incoming and outgoing nodes.

Figure 9:
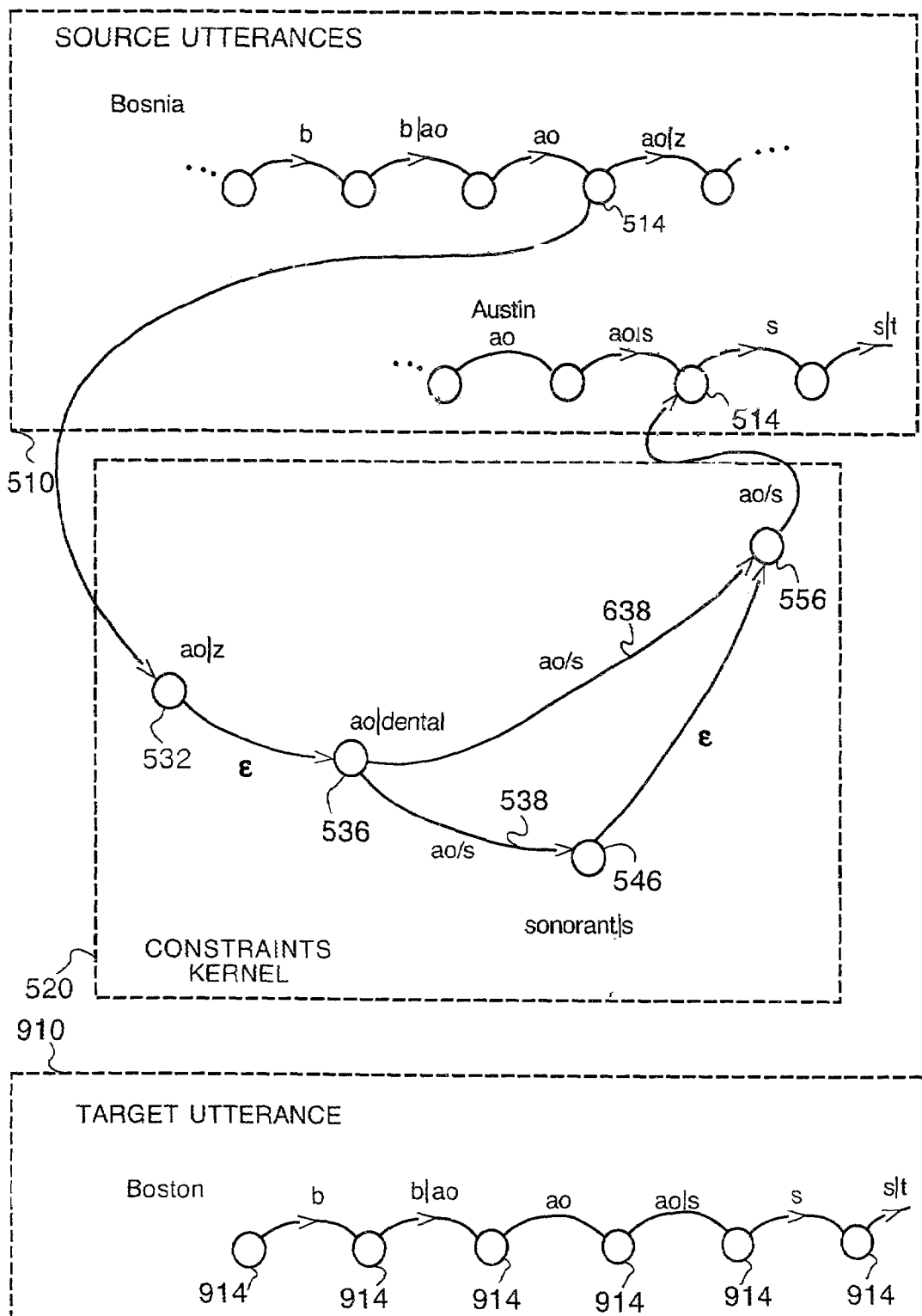
FIG. 9 is a diagram that illustrates a path through the synthesis FST that corresponds to synthesis of the word from other words in the corpus.

Referring to FIG. 9, in order to illustrate how constraint kernel links different source utterances, consider a situation in which the source utterances include an utterance that includes the word BOSNIA and another utterance that includes the word AUSTIN, and the target utterance includes the word BOSTON, which can be synthesized by concatenating the beginning of BOSNIA with the end of AUSTIN. Using the TIMIT phonetic symbols, BOSNIA includes the phone sequence ( . . . , b, ao, z, . . . ) while AUSTIN includes the phone sequence ( . . . , ao, s, t, . . . ). The illustrated concatenation uses the ( . . . , b, ao) from BOSNIA and the (s, t, . . . ) from AUSTIN.

The paths joining source node 514 at the destination of the phone arc labeled ao is linked to incoming node 532 associated with ao|z. This node is linked to right-classed node 536 associated with ao|Dental, where z is of class Dental when following ao. An arc 538 links this right-classed node with left-classed node 546 associated with Sonorant|s, where ao is of class Sonorant when followed by s. This arc has cost C(ao|Dental, Sonorant|s). Left-classed node 546 associated with Sonorant|s is linked to outgoing node 556 associated with ao|s, which in turn is linked to source node 514 at the source of phone transition 516 in AUSTIN labeled by phone s. Right-classed node 536 associated with Sonorant|s is also linked directly to outgoing node 556 associated with ao|s by an arc 638, which has a cost C(ao|Dental,ao|s).

6 Waveform Concatentation (FIG. 1)

Waveform concatenator 160 receives one or more sequences of segment identifiers and forms target waveform 170 by concatenating the identified waveform segments. Waveform concatenator 160 applies a number of signal processing techniques to minimize the perceptual impact of joining the waveform segments from different utterances. For example, the waveform concatenator optionally modifies the pitch of the waveform segments or optionally modifies the segments' durations.

7 N-Best Waveform Concatenation

Waveform concatenator 160 can alternatively receive multiples sequences of segment. For example, unit selector 130 may provide an "N-best" list of sequences. Waveform concatenator 160 then selects a best one of those sequences based on the quality of the concatenations. In selecting the best of the sequences, the waveform concatenator can apply relatively computationally expensive approaches to determine whether the concatenation boundaries will yield acceptable quality. For example, approaches such as comparison of the specific spectral shapes of the segments, or voice or pitch patterns can be applied.

Rather than receiving a list of segment sequences from the unit selection, the waveform concatenator can receive graph of segment identifiers. Rather than considering complete sequences in turn, the waveform concatenator finds a best path through the graph based on the quality of the concatenations. In this way, unit selector 130 can be thought of as pruning the combinatorially large set of possible segment sequences that match the pronunciation of the target utterance to identify those segment sequences which are likely to result in a high quality concatenated waveform.

Alternatively a lattice can be used to represent multiple alternative segment sequences that match the target pronunciation.

8 Source Corpus Preparation

The utterances of the source corpus are segmented using a speech recognizer. In particular, for each source utterance, the corresponding word sequence is known. A speech recognition grammar is formed using essentially the procedure described for target utterance preprocessor 120. Using previously obtained acoustic models, the speech recognizer determines the best phone sequence that corresponds to the waveform for the source utterance, and the time boundaries of each of the phones in the sequence. The phone sequence and identifiers of the segments are then stored in source pronunciations and segmentations 140 and the recorded waveform is stored in source waveform segments 145.

Note that additional source utterances can be added without substantial reconfiguration of the system. Constraint kernel 520 remains unchanged, and the additional utterances are linked to the constrain kernel.

Typically, the source utterances are chosen from the domain in which the target utterances will be synthesized. In this way, many of the words and entire phrases occur that are in the target utterances may be found in a single source utterance, and therefore no concatenation cost is incurred when using a subsequence of segments from a single source utterance.

9 Concatenation Constraints and Costs (FIGS. 10A–15D)

In a first version of synthesis system 100, concatenation costs and constraints 150, including the concatenation costs $c(\bullet,\bullet)$ and left and right substitution costs $S_{L/R,\bullet}(\bullet,\bullet)$, are predetermined based on linguistically-motivated considerations and have been adjusted based on experimentation to improve the quality of the synthesized speech.

Concatenation costs $c(a,b)$ depend on which of a number of classes phones a and b belong to. These classes are chosen to be as listed in FIG. 10A. The concatenation costs for these classes are shown in FIG. 10B. The row of the table represents the class of the first phone and column represents the class of the second phone. For example, the cost of concatenating two vowels is 10000, while the cost of concatenating a nasal followed by a semivowel is 10. Note that these costs are not symmetrical. For example, the cost of concatenating a semivowel followed by a nasal is 7500.

Substitution costs are also set according to classifications of the phones involves. The left and right substitution costs $s_{L,a}(b,C)$ and $s_{R,a}(b,C)$ depend on a global classification of the phone a. These classes are shown in FIG. 11. For any particular class A, the substitution cost depends on the class B to which b belongs and the class C. For example, $s_{L,a}(b,C)=s_{L,A}(B,C)$, where the classifications B and C depend on the class A. The table in FIG. 12A shows the possible classes B and C when A=vowels. The table in FIG. 12B shows the values of $s_{L,Vowel}(B,C)$, where B is represented by the row and C is represented by the column of the table. For example, the cost of using a vowel that is followed by a labial in the source corpus rather than following an m is 100. Again these substitution costs are not necessary symmetric. The cost of using a vowel that is followed by an m in the corpus rather than being followed by a labial is 1000. The table in FIG. 12C shows the right substitution costs for these classes.

The context classes when phone a is a fricative are different for the left and the right substitution costs. FIG. 13A shows the classes for B and C for the left substitution cost and FIG. 13B shows the classes for the right substitution cost. The table in FIG. 13C contains the left substitution cost and the table in FIG. 13D are the right substitution costs. In this embodiment, the cost of substituting phones in a same class is 10 and the cost of substituting across classes is 100.

FIGS. 14A–D show the classes and costs when phone a is a stop, in the same format as FIGS. 13A–D, and FIGS. 15A–D show the classes and costs when phone a is a nasal.

10 Automatic Determination of Concatenation Costs

In another embodiment, the particular values of the concatenation and substitution costs are determined from speech data directly rather than based on experimentation and manual tuning. For various classes of units, statistical distributions of measurements of signal characteristics of those units are determined and information-theoretic relationships between the distributions are used to determine the costs.

For the substitution costs, distributions of meal-cepstral coefficients are used. For example, $s_{L,a}(b,C)$, which is the cost of using a a that followed a class C phone in its source utterance rather than following an b, depends on the statistical distribution of all units labeled with phone a that were preceded by a phone of class C in the source corpus, $p_{[C]a}(x)$, and the distribution of units with phone a preceded by an b, $p_{[b]a}(x)$. The left substitution cost is then computed as the Kullback-Leibler divergence $s_{L,a}(b,C)=D(p_{[b]a}(x)\|p_{[C]a}(x))$, where $D(p(x)\|q(x))$ is computed as the expected value of $\log(p(x)/q(x))$, which is the integral of $p(x)\log(p(x)/q(x))$. The right substitution cost is computed similarly as $s_{R,a}(b,C)=D(p_{a[b]}(x)\|p_{a[C]}(X))$ Concatenation costs are also computed based on the distributions of the mel-cepstral coefficients, and the joint distribution of these coefficients in successive units as they appear naturally in the source corpus. The concatenation cost is computed as the mutual information $c(a,b)=I(X;Y)$, where X is the random variable representing the distribution of the mel-cepstral in units labeled a when followed by units labeled b, and Y is the random variable representing the distribution of the coefficients in units labeled b when preceded by a. The value of $c(a,b)$ is computed as the expected value of $\log(p_{ab}(x,y)/p_{a[b]}(x)p_{[a]b}(y))$, where $p_{ab}(x,y)$ is the joint distribution of the coefficients in a successive pair of units labeled a–b.

The classes to which these approaches are applied either set manually, or can be determined using a data-driven clustering approach, such as agglomerative clustering.

Figure 16:
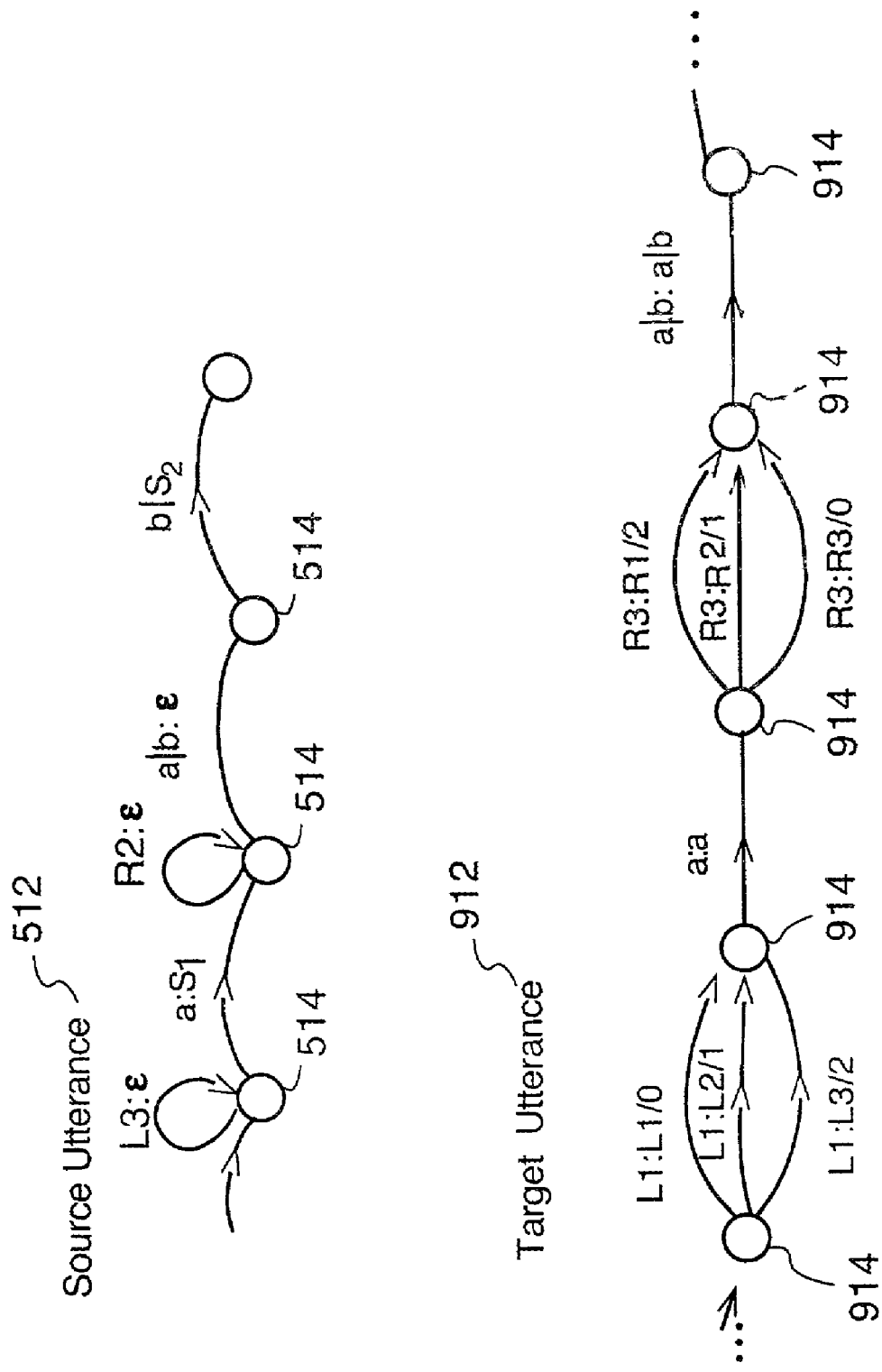
FIG. 16 is a diagram that illustrates alternative representation of source and target utterances which are annotated with diacritics.

11 Alternative Units (FIG. 16)

The description above concentrates on implementations in which the segments of the source utterances are associated with phone-based units. Alternative implementations are not limited to such units. One alternative is to use different size units. For example, units smaller than phones can be used, or units larger than phones, such as syllables, or even words or phrases can be used. The units can alternatively symbolically encode other information about the segments of the source utterances. Such information can include prosodic information, such as categorized lexical stress, pitch, or pitch trajectory.

Referring to FIG. 16, in another alternative approach, segments can be optionally annotated with diacritics, which describe, for example, quantized levels of pitch. Each source utterance is encoded with a loop on some or all of source nodes 514. In the example illustrated in FIG. 16, the segment labeled a has an attribute L3 at its beginning and an attribute R2 at its end.

In this approach, target utterances do not necessarily include diacritic marks. In such a case, the self-loops on the source nodes have no effect. However, diacritic marks can be encoded in the target pronunciation by including one or more arcs before or after each target node 914 as shown in FIG. 16. When only one such arc is present, it must match one of the self loops. A number or arcs, each with a different cost allows various degrees of mismatching with a corresponding increased cost in a "backing off" approach. As with the transition costs, these increased costs can be determined automatically from data.

12 Host Platform

Speech synthesis system 100 (see FIG. 1) is implemented on a platform that includes a general-purpose computer. Software is stored on a computer-readable medium, such as a magnetic or optical disk, or is provided to the computer over a data network. The general-purpose computer includes a processor that processes the software.

In alternative embodiments, functions of speech synthesis system 100 may be distributed and performed on various computers, and may be performed at different times. For example, different computers may perform the functions of target utterance pre-processor 120, unit selector 130, and waveform concatenator 150.

Forming the synthesis FST (see FIG. 4), as well as precomputing expressions such as opt(L∘P) or opt(L∘P∘T) (see FIG. 2), can be performed earlier than unit selection (see FIG. 3) and on different computers. For example, the precomputing can be performed on a general-purpose computer, with unit selection and waveform concatenation being performed on dedicated hardware, such as in an embedded system. The dedicated hardware can be a microprocessor, and can optionally include special-purpose logic used in the unit selection process.

It is to be understood that the foregoing description is intended to illustrate and not to limit the scope of the invention, which is defined by the scope of the appended claims. Other embodiments are within the scope of the following claims.

What is claimed is:

1. A method for selecting segments from a corpus of source utterances for synthesizing a target utterance, comprising:

searching a precomputed graph in which each path through the graph identifies a sequence of segments of the corpus of source utterances and a corresponding sequence of unit labels that characterizes a pronunciation of a concatenation of that sequence of segments, each path a numerical score that characterizes a quality of the sequence of segments;

wherein searching the precomputed graph includes matching a pronunciation of the target utterance to paths through the graph, and selecting segments for synthesizing the target utterance based on numerical scores of matching paths through the graph;

the precomputed graph includes a first part that encodes a sequence of segments and a corresponding sequence of unit labels for each of the source utterances, and a second part computed in advance of run-time when the target utterance is known that includes paths for coupling segments of the source utterances and encodes allowable transitions between segments of different source utterances and encodes a transition score for each of those transitions; and matching the pronunciation of the target utterance to paths through the graph includes considering paths in which each transition between segments of different source utterances identified by that path corresponds to a different subpath of that path that passes through the second part of the graph.

2. The method of claim 1 wherein selecting segments for synthesizing the target utterance includes identifying a path through the graph that matches the pronunciation of the target utterance and selecting the sequence of segments that is identified by the determined path.

3. The method of claim 2 wherein determining the path includes determining a best scoring path through the graph.

4. The method of claim 3 wherein determining the best scoring path involves using a dynamic programming algorithm.

5. The method of claim 2 farther comprising concatenating the selected sequence of segments to form a waveform representation of the target utterance.

6. The method of claim 1 wherein selecting the segments for synthesizing the target utterance includes determining a plurality of paths through the graph that each matches the representation of the pronunciation of the target utterance.

7. The method of claim 6 wherein selecting the segments further includes forming a plurality of sequences of segments, each associated with a different one of the plurality of paths.

8. The method of claim 7 wherein selecting the segments further includes selecting one of the sequences of segments based on characteristics of those sequences of segments not determined by the corresponding sequences of unit labels associated with those sequences.

9. The method of claim 1 further comprising forming a representation of a plurality of pronunciations of the target utterance, and wherein searching the graph includes matching any of the pronunciations of the target utterance to paths through the graph.

10. The method of claim 1 further comprising forming a representation of the pronunciation of the target utterance in terms of alternating unit labels and transitions labels.

11. The method of claim 1, wherein selecting the segments for synthesis includes evaluating a score for each of the considered paths that is based on the transition scores associated with the subpaths through the second part of the graph.

12. The method of claim 1 wherein a size of the second part of the graph is substantially independent of a size of the source corpus, and a complexity of matching the pronunciation through the graph grows less than linearly with the size of the corpus.

13. The method of claim 1 wherein the graph is associated with a finite-state transducer which accepts input symbols that include unit labels and transition labels, and that produces identifiers of segments of the source utterances, and wherein searching the graph is equivalent to composing a finite-state transducer representation of a pronunciation of the target utterance with the finite-state transducer with which the graph is associated.

14. A computer-readable medium comprising instructions for causing a computer to perform functions comprising selecting segments from a corpus of source utterances for synthesizing a target utterance, wherein selecting the segments comprises:

searching a precomputed graph in which each path through the graph identifies a sequence of segments of the corpus of source utterances and a corresponding sequence of unit and transition labels that characterizes a pronunciation of a concatenation of that sequence of segments, each path being associated with a numerical score that characterizes a quality of the sequence of segments;

wherein searching the precomputed graph includes matching a pronunciation of the target utterance represented by unit labels and transition labels to paths through the graph, and selecting segments for synthesizing the target utterance based on the numerical scores of matching paths through the graph;

the precomputed graph includes a first part that encodes a sequence of segments and a corresponding sequence of unit labels for each of the source utterances, and a second part computed in advance of run-time when the target utterance is known that includes paths for coupling segments of the source utterances and encodes allowable transitions between segments of different source utterances and encodes a transition score for each of those transitions; and matching the pronunciation of the target utterance to paths through the graph includes considering paths in which each transition between segments of different source utterances identified by that path corresponds to a different subpath of that path that passes through the second part of the graph.

* * * * *